(12) United States Patent
Suzuki

(10) Patent No.: US 6,428,326 B2
(45) Date of Patent: Aug. 6, 2002

(54) ASSEMBLY OF A VEHICLE BODY AND AN ELECTRICAL CONNECTION BOX INSTALLED THEREON

(75) Inventor: Tatsuo Suzuki, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 09/858,467

(22) Filed: May 17, 2001

(30) Foreign Application Priority Data

May 18, 2000 (JP) ........................................ 2000-146215

(51) Int. Cl.$^7$ ............................................... H01R 33/00
(52) U.S. Cl. ........................... 439/34; 439/341; 361/643
(58) Field of Search .................. 439/34, 76.2; 307/9.1, 307/10.1; 361/643, 642, 652, 823, 824

(56) References Cited

U.S. PATENT DOCUMENTS

| | | | |
|---|---|---|---|
| 5,497,036 A | * 3/1996 | Zemlicka | 307/9.1 |
| 5,501,607 A | 3/1996 | Yoshioka et al. | 438/142 |
| 5,557,067 A | 9/1996 | Messelhi | 174/59 |
| 5,944,209 A | 8/1999 | Daoud | 220/3.8 |

FOREIGN PATENT DOCUMENTS

| | | |
|---|---|---|
| EP | 0 849 832 A2 | 6/1998 |
| EP | 0 849 832 A3 | 9/2000 |
| JP | 1-114318 | 5/1989 |
| JP | 3-106819 | 11/1991 |
| JP | 11008013 | 1/1999 |

\* cited by examiner

Primary Examiner—P. Austin Bradley
Assistant Examiner—Alexander Gilman
(74) Attorney, Agent, or Firm—Oliff & Berridge, PLC

(57) ABSTRACT

When an electrical connection box body is installed on a vehicle body, for a temporary pivotable mounting of the box body on the vehicle body, one of the box body and the vehicle body has a shaft and the other has a bracket to receive the shaft at a predetermined location, so as to allow pivoting of the box body about the shaft axis. Locating guide surfaces position the box body relative to the vehicle body during mounting, prior to receipt of the shaft at said predetermined location on the bracket. This makes the operation of installing the box easier and more precise and avoids looseness of the box body during assembly operations carried out on the box.

7 Claims, 7 Drawing Sheets

ASSEMBLY OF A VEHICLE BODY AND AN ELECTRICAL CONNECTION BOX INSTALLED THEREON

BACKGROUND OF THE INVENTION

1. Field of Invention

The present invention relates to an assembly comprising a vehicle body and an electrical connection box, particularly a body of the box, installed on the vehicle body. The invention is applicable, for example, to an automobile body. The invention also relates to a method of temporarily connecting the electrical connection box body to the vehicle body.

2. Description of Related Art

It is known that the body of an electrical connection box is, through a shaft, rotatably mounted on a bracket fixed on a vehicle body such that the body of the box is rotatable on the shaft. In a vehicle manufacturing line, an operator performs an operation by rotating the body of the electrical connection box to an open position thereof and holding it at the open position. When the operator finishes one operation, he returns the body of the box to its closed position. In a subsequent operation, the operator again opens and closes the body of the box. When the operator terminates a final operation, he fastens the body of the box to the vehicle body. Accordingly, until the final operation is completed, the operator keeps the body of the box temporarily fixed to the vehicle body.

The conventional method of temporarily fixing the body of the box to the vehicle body is by screws and nuts, while the body of the box is mounted on the shaft inserted through the bracket. The body of the box is rotatable on the shaft. Thus, it is necessary to employ a large number of component parts and many operational steps, which causes the manufacturing cost of the box to be high.

To solve the problem, it is conceivable to give the front end of the bracket a hook shape and to fit the shaft, provided on the body of the box, into the hook-shaped portion to temporarily fix the body to the bracket. This construction may facilitate the connection between the body of the box and the bracket, thus avoiding the above-described disadvantage. However, when fixing the body of the box to the vehicle body temporarily, the shaft provided on the body of the box may not be placed in correct position with respect to the bracket. Thus, if the shaft is incorrectly located with respect to the hook-shaped portion when mounting the body of the box in a small space such as in an engine room, it is difficult to perform the operation of fixing the body of the box to the vehicle body precisely.

Japanese Laid-Open Patent Application No. 1-114318 shows an electrical connection box pivotally mounted on a support at one end by a hollow shaft on the support which is embraced by a sleeve of the box. A bolt is employed to hold the assembly together.

SUMMARY OF THE INVENTION

Accordingly, it is an object of the present invention to enable assembly of a vehicle body and an electrical connection box whose body can be easily temporarily fixed to the vehicle body in a predetermined position.

According to the present invention, there is provided an assembly including a vehicle body and an electrical connection box body installed on the vehicle body. For a temporary pivotable mounting of the box body on the vehicle body, one of the box body and the vehicle body has a shaft and the other has a bracket adapted to receive the shaft at a predetermined location so as to allow pivoting of the box body about the shaft axis. The assembly further has locating surfaces for positioning the box body relative to the vehicle body during the mounting prior to receipt of the shaft at the predetermined location on the bracket. The locating surfaces act to pre-position the box body so that correct assembly of the shaft and the bracket is easily achieved.

In the electrical connection box of the present invention, the locating surfaces are preferably surfaces of a guide groove into which the bracket can be fitted during the mounting of the shaft onto the bracket, and the width of the guide groove is substantially equal or slightly more than that of the bracket.

In the present invention, when mounting the shaft onto the bracket, the locating surfaces place the body of the electrical connection box in the correct position. In this state, the shaft is fitted into the bracket. Accordingly, it is possible to temporarily fix the body of the box to the vehicle body in the correct position of the body of the box with respect to the bracket.

For example, before the shaft is fitted into its final position on the bracket, the bracket is fitted into the guide groove. The width of the guide groove is set almost equal to the width of the bracket. Thus, when fitting the shaft onto the bracket, it is possible to hold the body of the electrical connection box in position without being loose.

In a preferred embodiment, the box body has a plurality of the shafts on a common axis, and has a plurality of projections arranged in a row and defining between them guide grooves whose opposed surfaces constitute the locating surfaces. The shafts respectively span across the guide grooves between the opposite surfaces thereof. The vehicle body has a plurality of the brackets which are respectively received in the guide grooves and have hook-shaped portions receiving the shafts. The projections may have end faces which constitute stop surfaces which abut the vehicle body to limit the degree of rotation of the box body about the axis of the shafts relative to the vehicle body.

The invention further provides a method of temporarily connecting an electrical connection box body to a vehicle body such that the temporarily connected box body is rotatable relative to the vehicle body. The method includes a step of inserting a shaft, provided on one of the box body and the vehicle body, into a pivoting location on a bracket, provided on the other thereof. During the inserting step, before the shaft reaches the pivoting location on the bracket, the bracket is first inserted between locating surfaces provided adjacent the shaft acting to constrain movement of the bracket relative to the shaft in a direction parallel to the rotational axis of the shaft. This locates the bracket at a desired position for the receipt of the shaft at the pivoting location.

BRIEF DESCRIPTION OF THE DRAWINGS

Embodiments of the invention will now be described by way of non-limitative example with reference to the accompanying drawings in which.

DETAILED DESCRIPTION OF THE PREFERRED EMBODIMENTS

Figure 1:
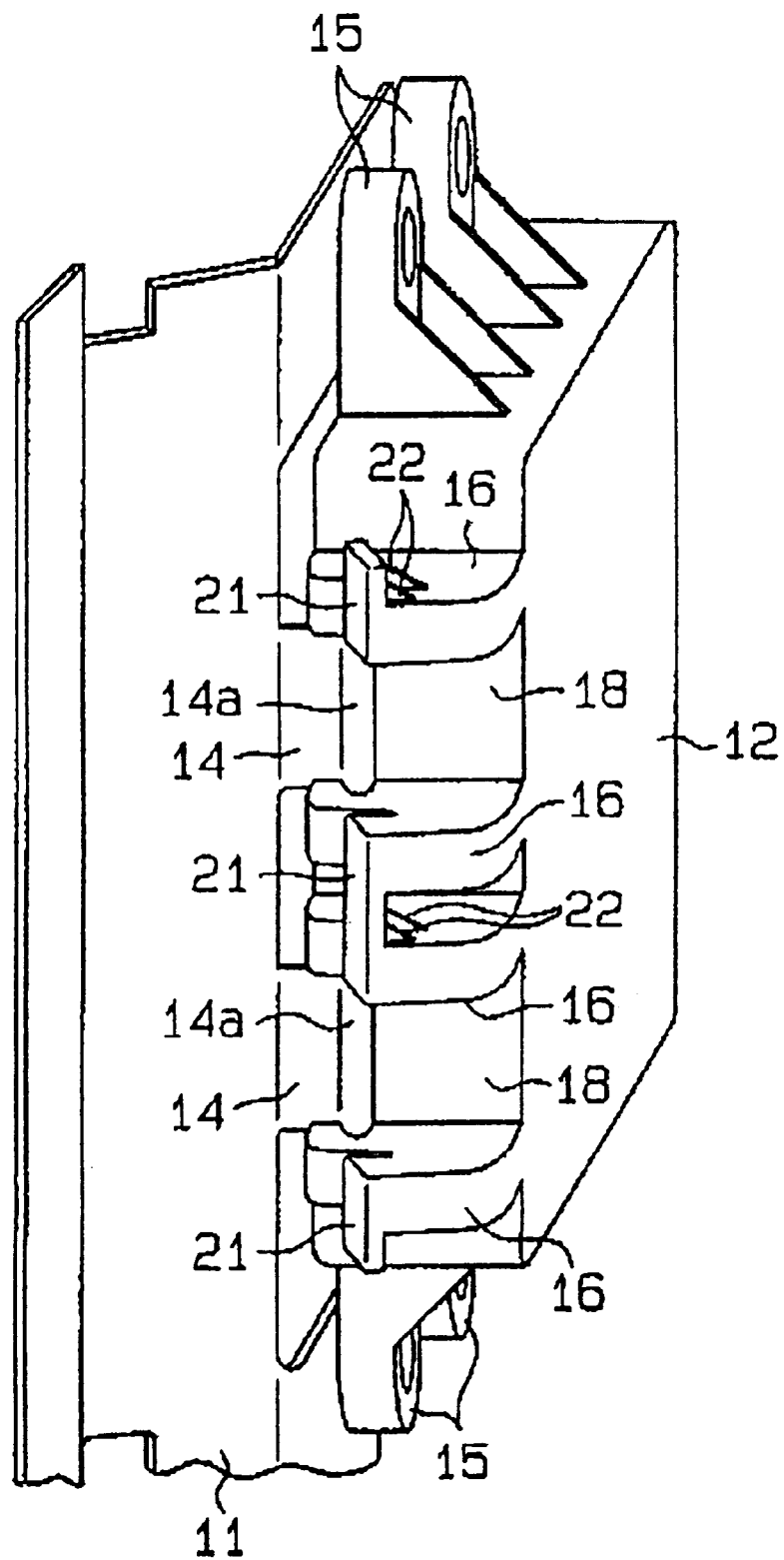
FIG. 1 is a perspective view of a portion of a vehicle body and a body of an electrical connection box in an embodiment of the present invention, in which the box body is shown closed.
Figure 2:
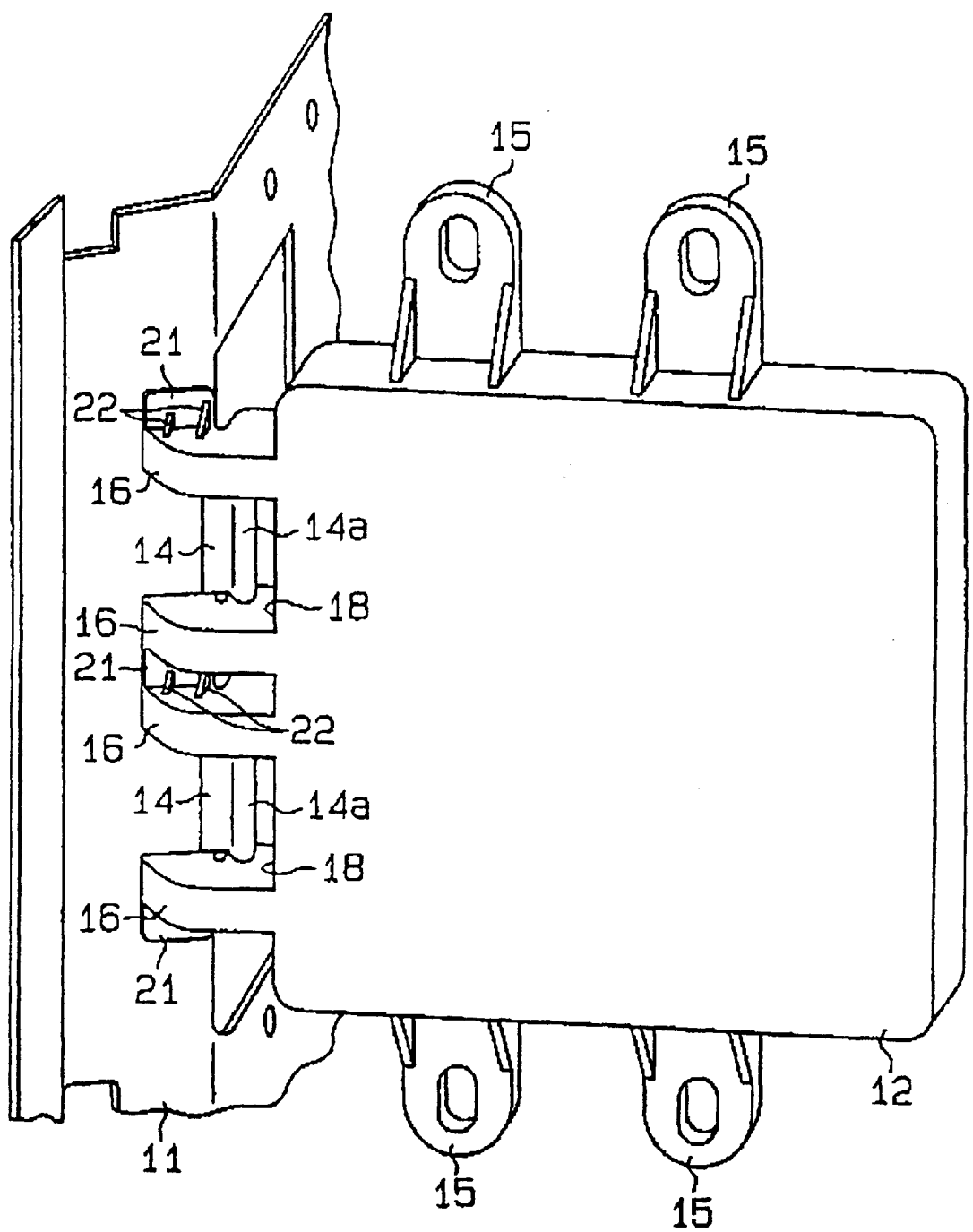
FIG. 2 is a perspective view corresponding to FIG. 1, in which the box body of FIG. 1 is shown open.
Figure 3:
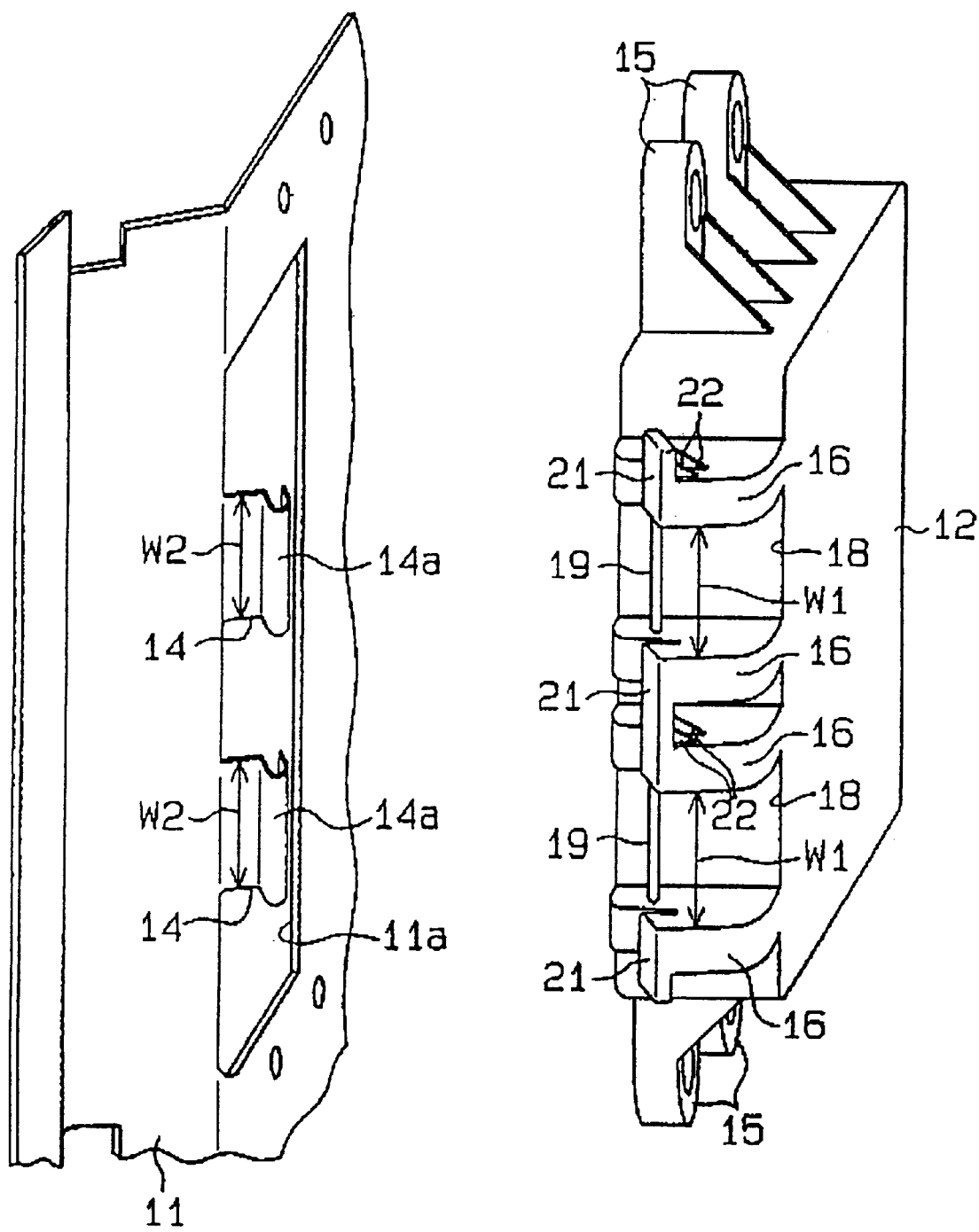
FIG. 3 is a perspective view corresponding to FIG. 1, in which the vehicle body and the box body are separated from each other.

As shown in FIG. 1, a body 12 of an electrical connection box made of molded synthetic resin, for example, is mounted on a portion of a vehicle body 11, for example in the engine room of an automobile. In practice the box body 12 may contain electrical components and fittings, not shown here. As shown in FIG. 3, an opening 11a formed in the vehicle body 11 can be opened and closed by the body 12. The plane of the opening 11a is set vertical, as seen in FIG. 3, or in any other desired orientation. Two brackets 14 spaced at a predetermined interval project forwardly on the vehicle body 11 at positions close to one edge of the opening 11a. A fastening portion in the shape of a hook 14a is formed at the front end of each bracket 14.

As shown in FIG. 1, a plurality of mounting brackets 15 project from upper and lower end faces of the body 12. A bolt (not shown) or the like may be inserted into each bracket 15 to fasten the body 12 to the vehicle body 11 permanently, after completion of the assembly of components and the like in the box. A plurality (four in the embodiment) of projections 16 are formed integrally with a side face of the body 12. This side face of the body 12 together with the two opposed upper projections 16 and the two opposed lower projections 16 defines upper and lower guide grooves 18, respectively.

Figure 4:
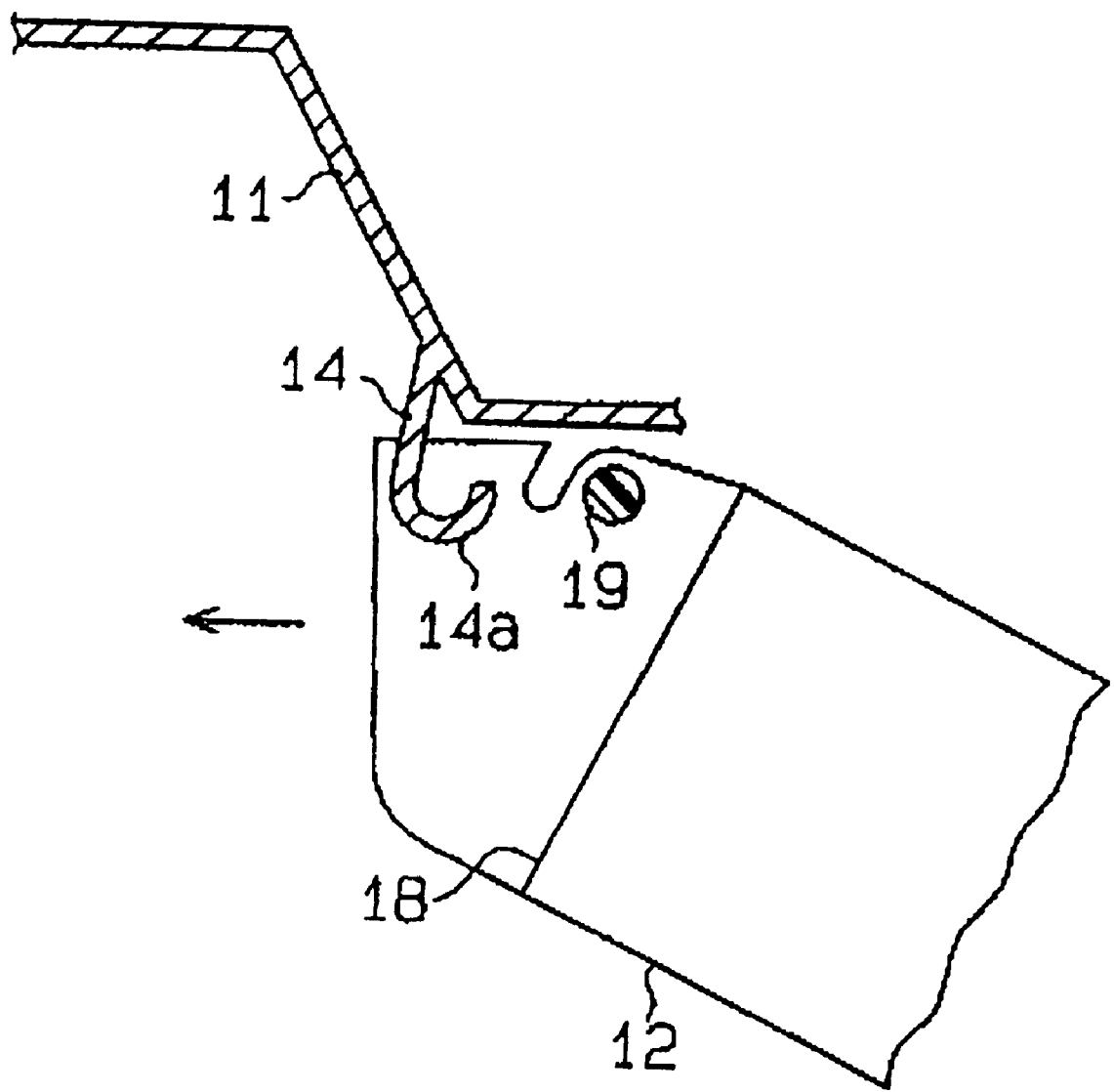
FIGS. 4 to 7 are diagrammatic sectional views partly showing a sequence of actions when the box body is temporarily fixed to the vehicle body.
Figure 5:
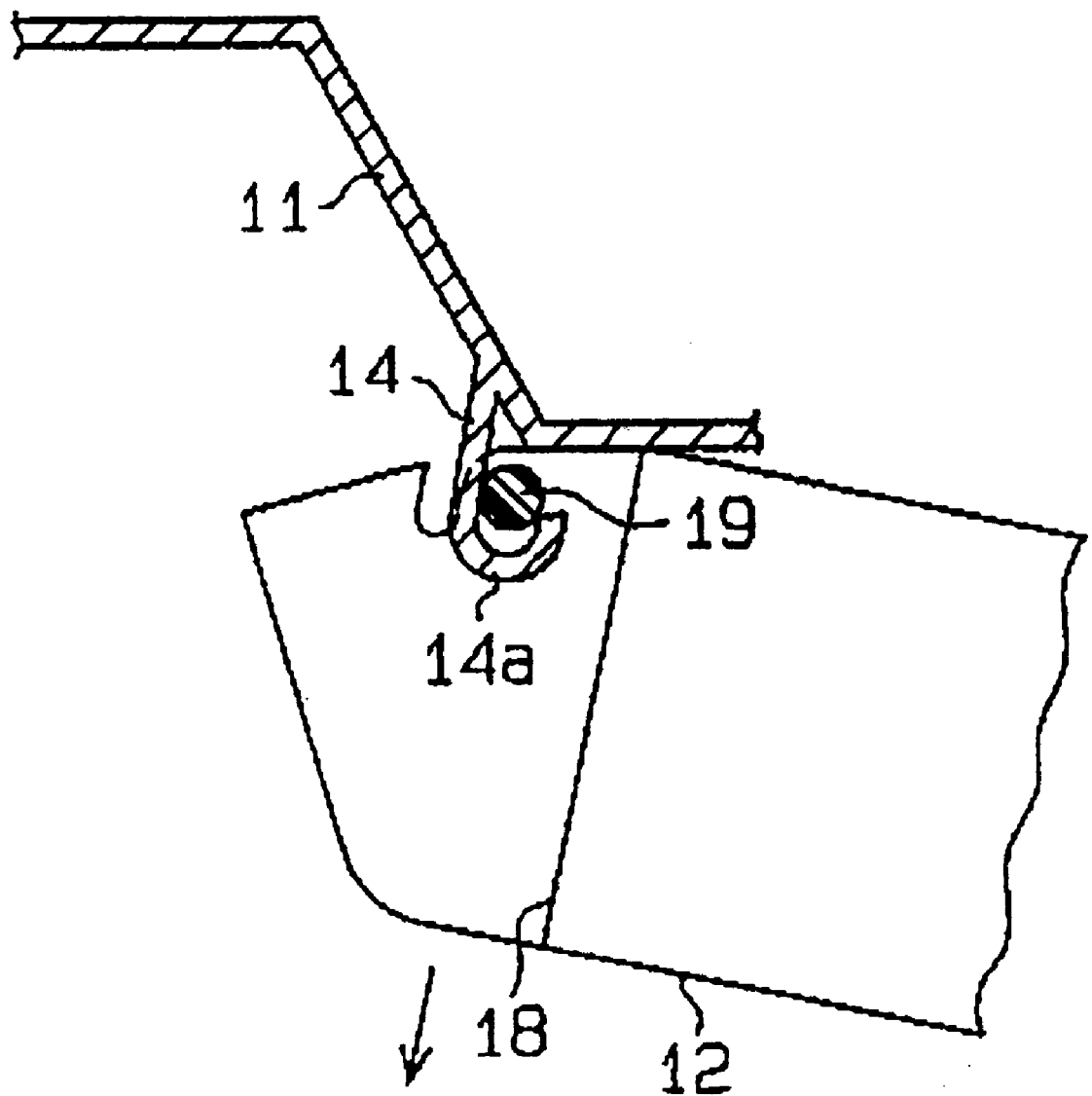
Figure 6:
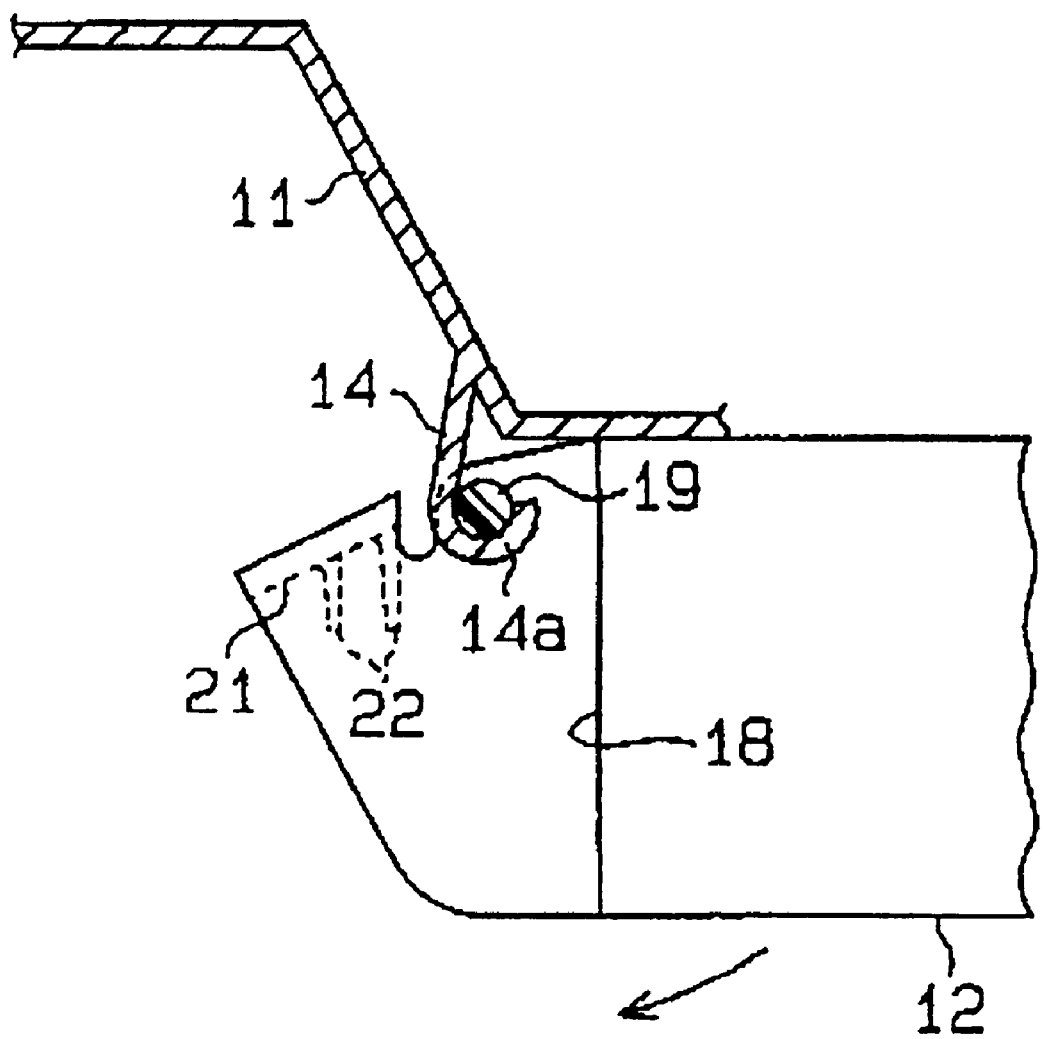

A shaft 19 (see FIG. 3) extending vertically is provided inside each guide groove 18 spanning across the groove between the opposed side faces thereof. The shafts 19 are on a common axis, and may be made of synthetic resin, for example, and may be formed integrally with the projections 16. As shown in FIGS. 4–6, when temporarily fixing the body 12 of the box to the vehicle body 11, the shafts 19 are inserted into the hooks 14a with the brackets 14 fitted into the guide grooves 18 such that the body 12 is rotatable about the axis of the shafts 19. The width W1 of the guide groove 18 is set almost equal to the width W2 of the bracket 14. This is to prevent a gap existing between the guide groove 18 and the bracket 14 when the bracket 14 is fitted into the guide groove 18.

Figure 7:
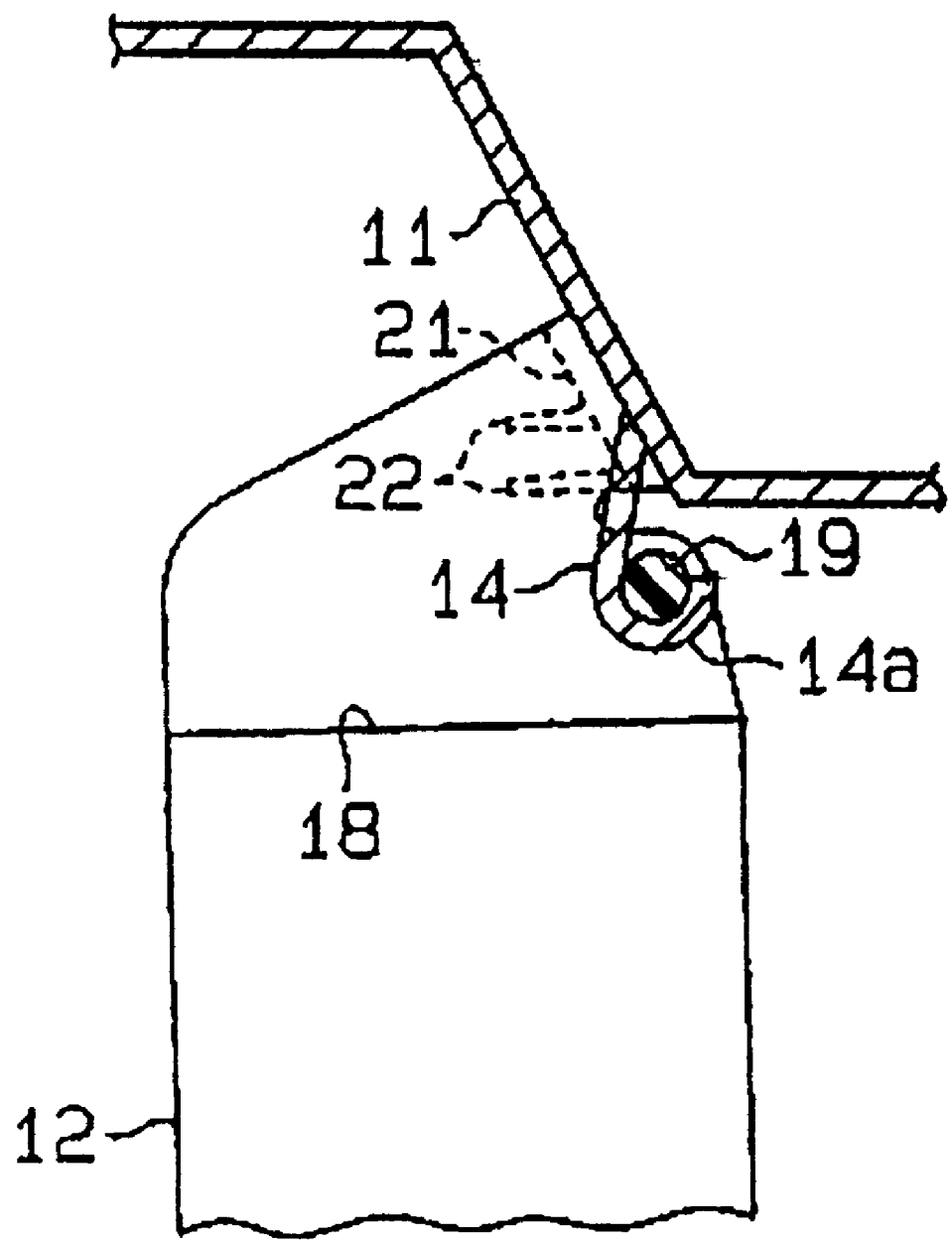

Stops 21 project from the front ends of the projections 16. Referring to FIG. 7, when the body 12 is rotated on the shaft axis in order to open the opening 11a of the vehicle body 11, the stops 21 contact the vehicle body 11 to limit the amount of rotation of the body 12. Reinforcing ribs 22 may be integrally formed between the stops 21 and the projections 16, to prevent the stops 21 from being deformed or damaged when they are brought into contact with the vehicle body 11.

An exemplary method of temporarily fixing the electrical connection box 12 having the above-described construction to the vehicle body 11 is described as follows.

As shown in FIGS. 4 and 5, the box 12 is brought to the body 11 so that the brackets 14 fit into the guide grooves 18. The shafts 19 are thus contacted with the brackets 14 (leftward movement in FIG. 4). In this state, both vertical ends of the bracket 14 are in contact with the opposed inner surfaces of the respective guide groove 18. Thereby, the body 12 is prevented from being displaced along the shaft incorrectly with respect to the brackets 14. Then, as shown in FIG. 5, the body 12 is moved to the front ends of the brackets 14 (see arrow in FIG. 5) to fit the shafts 19 into the hooks 14a of the brackets 14. Thereby, the body 12 is temporarily fixed to the brackets 14 such that it is rotatable about the axis of the shafts 19 held in the hooks 14a. The operator or operators can carry out the necessary assembly operations with the box temporarily mounted, before finally securing it permanently as mentioned above.

The embodiment provides the following effects:

(1) Before the shafts 19 formed on the body 12 are fitted into the brackets 14 formed on the vehicle body 11, the brackets 14 are received into the guide grooves 18. Thus, the shafts 19 can be fitted into the hooks 14a of the brackets 14 with the body 12 already at the correct vertical position. Accordingly, it is possible to prevent the body 12 from getting out of place and thereby to easily temporarily fix the body 12 correctly to the vehicle body 11 even in a small space, such as in an engine room.

(2) The width W1 of the guide groove 18 formed on the body 12 is substantially equal to the width W2 of the bracket 14. Thus, when the shafts 19 are fitted into the hooks 14a of the brackets 14, it is possible for the operator to hold the body 12 without looseness or shaking of the body 12 when carrying out an assembly operation.

(3) The projections 16 are formed on an outer surface of the body 12. The stops 21 are formed at the front ends of the projections 16. Therefore, when the body 12 is rotated by a predetermined amount in the direction to open the opening 11a of the vehicle body 11, the stops 21 contact the vehicle body 11, so that it is possible to prevent the body 12 from rotating more than a necessary amount. Consequently, excessive force is not applied to the brackets 14 or the shafts 19. Thus, it is possible to minimize risk that the brackets 14 or the shafts 19 will be damaged or broken.

The reinforcing ribs 22 may be formed on the body 12 to reinforce the stops 21, to minimize risk that the stops 21 will be deformed when they strike against the vehicle body 11 during the rotation of the body 12.

Some possible modifications of this embodiment of the present invention are described below.

In the embodiment, the widths of the two guide grooves 18 are equal. However, the width of the upper bracket 14 may be different from that of the lower bracket 14 to allow an operator to recognize the mounting orientation of the body 12. In the case where the width of the upper bracket 14 is different from that of the lower bracket 14, the width of the upper guide groove 18 and that of lower guide groove 18 are altered according to the width of the upper bracket 14 and that of the lower brackets 14, respectively.

In the embodiment, the number of each of the brackets 14 and the shafts 19 is two. However, the number thereof may be one or three or more.

In the embodiment, the bracket 14 is provided on the vehicle body 11, and the shaft 19 is provided on the box body 12. Instead, it is possible to provide the shaft 19 on the vehicle body 11 and the bracket 14 on the box body 12.

A further advantage of the illustrated electrical connection box is that the shafts, the stops, and the reinforcing ribs may be formed integrally by molding on the body. This eliminates the need for mounting any one of the shaft, the stop, and the reinforcing rib on the body of the electrical connection box, thus allowing its production to be easy and its manufacturing cost to be low.

As described above in detail, by the present invention, the body of the electrical connection box can be easily temporarily fixed to the vehicle body with the box body placed in the correct position.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. An assembly, comprising:

a vehicle body;

an electrical connection box body installed on said vehicle body;

a plurality of projections arranged in a row on one of said box body;

a plurality of shafts on a common axis disposed between opposing surfaces of two projections, each projection continuously extending between adjacent shafts in a direction along the common axis;

a plurality of brackets projecting from the vehicle body with a space between adjacent brackets, each bracket adapted to receive a respective one of said shafts at a predetermined location thereon to allow pivoting of said box body about said common axis of said shafts;

said shafts being aligned opposite of said brackets so that the brackets are received between the projections while the projections are simultaneously received in the spaces adjacent to the brackets;

said projections being spaced apart by a distance at least equal to a length in a direction of the common axis of a corresponding bracket to be received between the projections and said brackets being spaced by a distance at least equal to a length in a direction of the common axis of a corresponding projection to be received in the space between the brackets; and locating surfaces on opposing surfaces of said projections that position said brackets relative to said shafts during mounting thereof prior to receipt of said shafts at said predetermined locations on said brackets.

2. An assembly according to claim 1, wherein said locating surfaces comprise a pair of opposed surfaces of at least one guide groove into which said bracket is inserted during mounting of said box body on said vehicle body.

3. An assembly according to claim 1, wherein said locating surfaces act to restrain movement of said box relative to said vehicle body in a direction of said common axis of said at least one shaft.

4. An assembly according to claim 1, wherein said vehicle body has a plurality of said brackets which are respectively received in guide grooves on the locating surfaces and have hook-shaped portions receiving said shafts.

5. An assembly according to claim 1, wherein said projections have end faces which constitute stop surfaces that abut said vehicle body to limit a degree of rotation of said box body about said common axis of said shafts relative to said vehicle body.

6. The assembly according to claim 5, where reinforcing ribs are formed between the projections and said faces.

7. A method of temporarily connecting an electrical connection box body to a vehicle body such that said temporarily connected box body is rotatable relative to said vehicle body, comprising:

inserting a plurality of shafts provided on said box body into pivoting locations on a plurality of brackets projecting from the vehicle body, wherein during said inserting step, before said shafts reaches said pivoting location on said at least one brackets, said brackets are first inserted between locating surfaces provided adjacent to the shafts to constrain movement of said brackets relative to said shafts in a direction parallel to the rotational axis of said shafts, simultaneously during said inserting step, as said shaft reaches said pivoting location, receiving at least one projection between the shafts on the box body in a space between two adjacent brackets, said inserting step and said receiving step thereby locating said brackets in a desired position for the receipt of said shafts at said pivoting locations on said brackets.

* * * * *